US010235150B2

(12) United States Patent
Peng et al.

(10) Patent No.: US 10,235,150 B2
(45) Date of Patent: Mar. 19, 2019

(54) SYSTEM AND METHODS FOR TOUCH PATTERN DETECTION AND USER INTERFACE ADAPTATION

(71) Applicant: Google Technology Holdings LLC, Mountain View, CA (US)

(72) Inventors: Long Peng, Buffalo Grove, IL (US); Xin Guan, Gurnee, IL (US); Olivier D Meirhaeghe, Lincolnshire, IL (US); Xiu Jin Wang, Gurnee, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 806 days.

(21) Appl. No.: 14/560,924

(22) Filed: Dec. 4, 2014

(65) Prior Publication Data

US 2016/0162276 A1 Jun. 9, 2016

(51) Int. Cl.
*G06F 8/60* (2018.01)
*G06F 3/0488* (2013.01)
*G06F 8/65* (2018.01)
*G06F 8/71* (2018.01)

(52) U.S. Cl.
CPC .............. *G06F 8/65* (2013.01); *G06F 3/0488* (2013.01); *G06F 3/04886* (2013.01); *G06F 8/60* (2013.01); *G06F 8/71* (2013.01)

(58) Field of Classification Search
CPC . G06F 8/65; G06F 3/0488; G06F 8/60; G06F 8/71; G06F 3/04886
See application file for complete search history.

(56) References Cited

U.S. PATENT DOCUMENTS

| 5,119,079 | A | * | 6/1992 | Hube | G03G 15/5016 345/173 |
|---|---|---|---|---|---|
| 5,565,894 | A | * | 10/1996 | Bates | G06F 3/0418 345/173 |
| 5,627,567 | A | * | 5/1997 | Davidson | G06F 3/0488 345/170 |
| 6,256,021 | B1 | * | 7/2001 | Singh | G06F 3/0418 345/173 |
| 6,573,844 | B1 | | 6/2003 | Venolia et al. | |
| 8,631,358 | B2 | | 1/2014 | Louch | |
| 8,719,001 | B1 | * | 5/2014 | Izdepski | G06F 8/61 703/22 |
| 9,396,092 | B1 | * | 7/2016 | Kuo | G06F 11/3664 |
| 9,645,914 | B1 | * | 5/2017 | Zhang | G06F 11/3664 |
| 2004/0178994 | A1 | * | 9/2004 | Kairls, Jr. | G06F 3/0418 345/173 |
| 2006/0267957 | A1 | * | 11/2006 | Kolmykov-Zotov | G06F 3/0416 345/173 |
| 2007/0174419 | A1 | * | 7/2007 | O'Connell | G06F 11/0709 709/217 |

(Continued)

*Primary Examiner* — Nicholas Klicos
(74) *Attorney, Agent, or Firm* — Shumaker & Sieffert, P.A.

(57) ABSTRACT

A communication system includes client devices that detect erroneous interactions with touch screen Graphical User Interfaces (GUIs) of software apps and transmit information about the erroneous interactions to servers which aggregate the information to identify erroneous interactions that occur at a significant rate across a population of devices. The software apps are updated to reduce the likelihood of the identified erroneous interactions and the updated versions of the apps are deployed to the client devices.

22 Claims, 9 Drawing Sheets

(56) References Cited

U.S. PATENT DOCUMENTS

| | | | | |
|---|---|---|---|---|
| 2007/0260749 | A1* | 11/2007 | Lahdensivu | G06F 9/4443 709/246 |
| 2008/0172633 | A1* | 7/2008 | Jeon | G06F 3/04886 715/810 |
| 2009/0150814 | A1* | 6/2009 | Eyer | G06F 3/04842 715/765 |
| 2010/0299596 | A1* | 11/2010 | Zalewski | G06F 1/1626 715/702 |
| 2011/0074685 | A1 | 3/2011 | Causey et al. | |
| 2011/0083104 | A1* | 4/2011 | Minton | G06F 3/04886 715/815 |
| 2011/0242032 | A1* | 10/2011 | Seo | G06F 3/04886 345/173 |
| 2011/0267280 | A1* | 11/2011 | De Mers | G06F 3/04886 345/173 |
| 2012/0036468 | A1* | 2/2012 | Colley | G06F 3/0418 715/773 |
| 2012/0147033 | A1* | 6/2012 | Singhal | G06F 3/147 345/629 |
| 2012/0169613 | A1* | 7/2012 | Armstrong | G06F 3/04886 345/173 |
| 2013/0021243 | A1* | 1/2013 | Lea | G06F 3/04812 345/157 |
| 2013/0044061 | A1* | 2/2013 | Ashbrook | G06F 3/0488 345/173 |
| 2013/0069946 | A1* | 3/2013 | Venon | A61B 5/00 345/428 |
| 2013/0120278 | A1* | 5/2013 | Cantrell | G06F 3/04886 345/173 |
| 2013/0120280 | A1* | 5/2013 | Kukulski | G06F 3/04883 345/173 |
| 2013/0212487 | A1* | 8/2013 | Cote | G06F 3/048 715/745 |
| 2013/0246861 | A1* | 9/2013 | Colley | G06F 3/0488 714/48 |
| 2014/0075244 | A1* | 3/2014 | Takahashi | G06F 11/3668 714/38.1 |
| 2014/0184512 | A1* | 7/2014 | Okuley | G06F 3/1454 345/168 |
| 2014/0184519 | A1* | 7/2014 | Benchenaa | G06F 3/0488 345/173 |
| 2014/0223328 | A1* | 8/2014 | Thomas | G06F 3/14 715/747 |
| 2014/0282061 | A1* | 9/2014 | Wheatley | H04N 21/431 715/745 |
| 2014/0304689 | A1* | 10/2014 | San Jose | G06F 8/71 717/134 |
| 2014/0344061 | A1* | 11/2014 | Choi | G06Q 30/0267 705/14.64 |
| 2015/0160765 | A1* | 6/2015 | Satou | G06F 3/04883 345/173 |
| 2015/0186128 | A1* | 7/2015 | Patton | G06F 8/65 717/170 |
| 2016/0188181 | A1* | 6/2016 | Smith | G06F 3/048 715/765 |

* cited by examiner

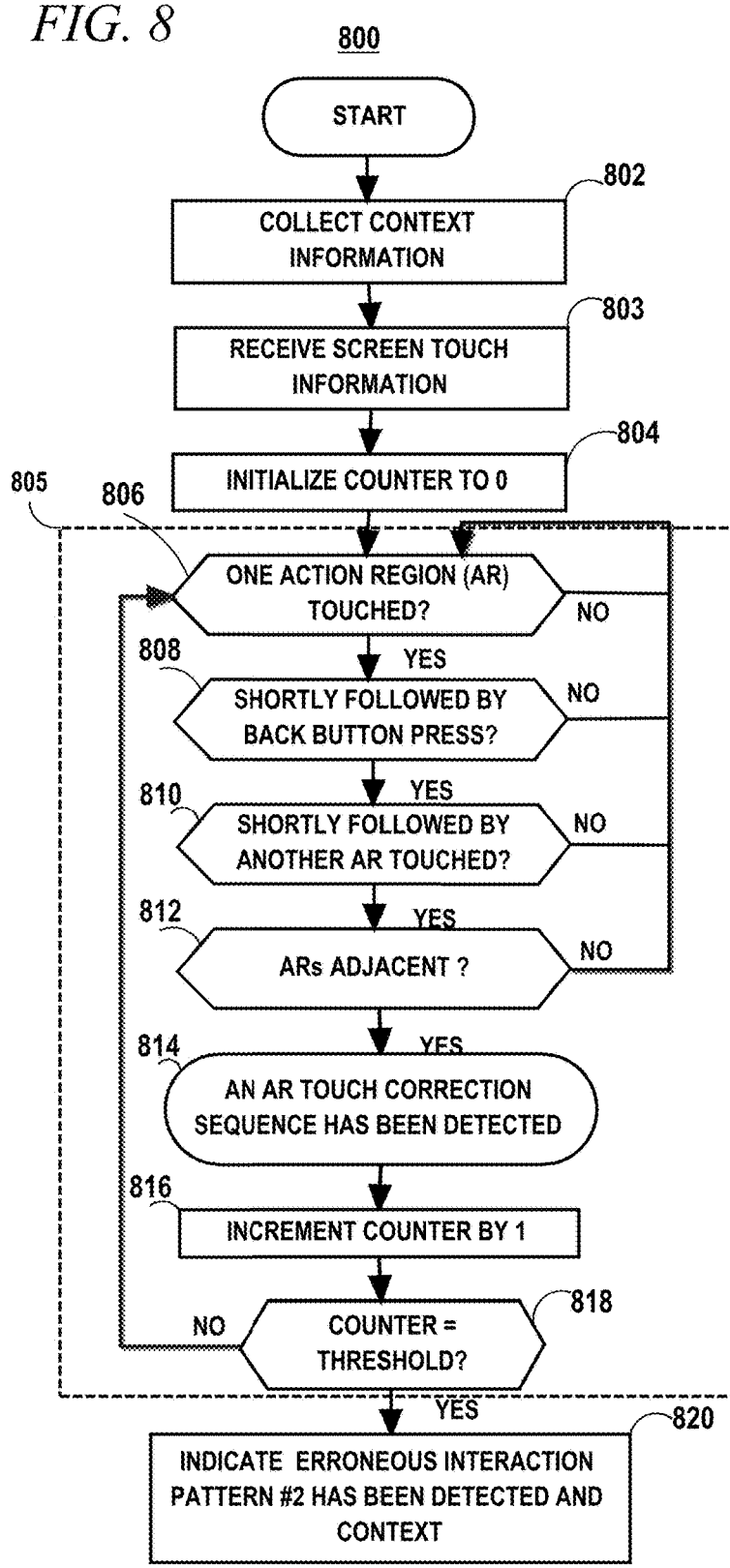

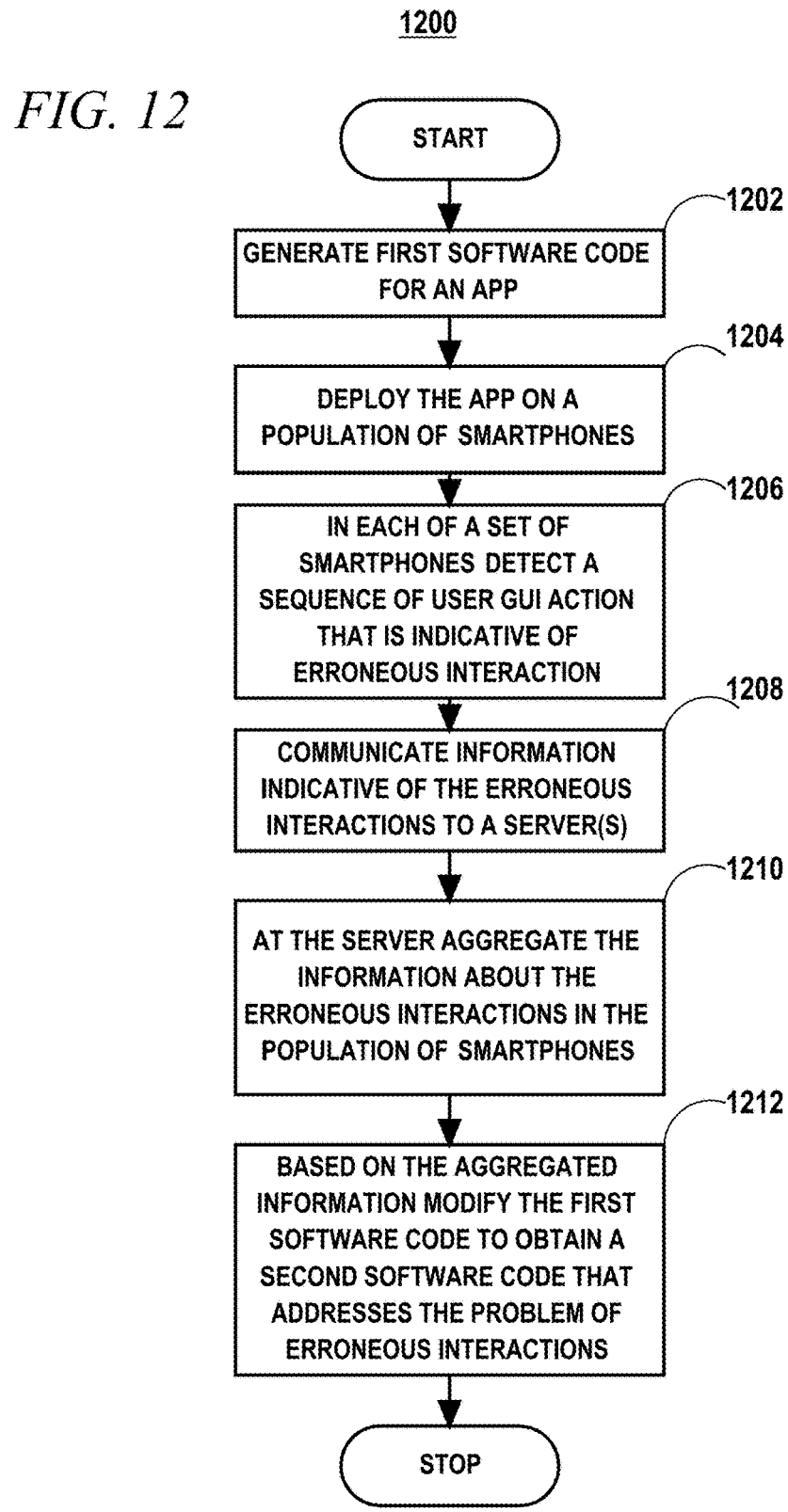

SYSTEM AND METHODS FOR TOUCH PATTERN DETECTION AND USER INTERFACE ADAPTATION

FIELD OF THE INVENTION

The present disclosure relates generally mobile device software applications.

BACKGROUND

In recent years the focus of consumer-oriented software developers has shifted away from personal computers towards software applications ("apps") for smartphone and tablet computers. While there are other, less-popular operating systems for smartphone and tablet computers, the most prevalent operating system for such devices is the Android™ operating system produced by Google Inc. of Mountain View Calif.

Android and certain other operating systems allow third party developers to develop apps that run on top of them. Moreover these operating systems and associated app stores allow device users to quickly search for, download, and install apps. The ease with which apps can be developed and put on sale through app stores has created an incentive for large numbers of software developers to create a myriad of apps. The number of apps is so large and growing at such a rate that it would be a daunting task to review the ergonomics of the Graphical User Interface (GUI) of each app.

This creates opportunities for assisting in checking the ergonomics of the GUIs of a large number of apps (e.g., >100,000) deployed on a large number of devices (e.g., >100,000,000) and thereby aiding in the improvement of the GUIs. Furthermore such a system might alert app store managers and/or app developers to apps that may have a problematic GUI.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

FIG. 8 is a flowchart of a process of detecting sequences of GUI actions indicative of erroneous interactions that may be run on the device shown in FIG. 2 and FIG. 3 according to another embodiment;

FIG. 12 is a flowchart of a method for identifying GUIs that are prone to fostering erroneous interactions and correcting such GUIs that may be run on the system shown in FIG. 1 according to an embodiment;

Figure 1:
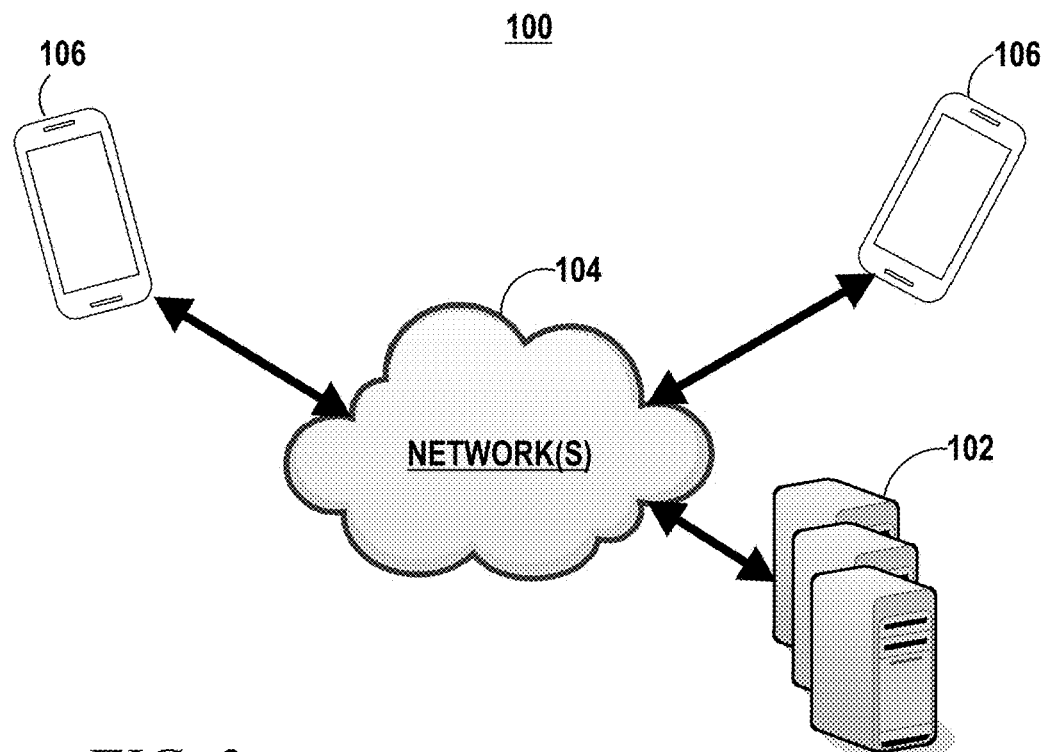
FIG. 1 is a schematic of a system, according to an embodiment, including one or more servers connected through one or more networks to multiple devices that can run apps.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION

Before describing in detail embodiments that are in accordance with the present disclosure, it should be observed that the embodiments reside primarily in combinations of method steps and apparatus components related to erroneous user interaction and GUI adaptation. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

FIG. 1 is a schematic of a system 100, according to an embodiment, including one or more servers 102 connected through one or more networks 104 to multiple devices 106 that can run apps. The servers 102 can be configured as networked servers or as a cloud server in which servers are collocated, or located in multiple locations, and in which servers can be reconfigured as needed to run multiple copies of server side software that process data in parallel. The one or more networks 104 can include wireless or wired networks and private or public networks, such as the Internet, as well as combinations thereof.

The devices 106 can take the form of smartphones or tablet computers or other electronic devices with GUIs such as internet-connected televisions, networked game consoles, and various types of electronic accessories with GUIs. The devices 106 may number in the hundreds of millions and there may be millions of devices running a given app. As described below in more detail, the devices 106 collect certain data indicative of problems with GUI operability or ergonomics and such data is communicated through the one or more networks 104 to the servers 102 which aggregate and process the data in order to discern such problems with GUI operability or ergonomics.

Figure 2:
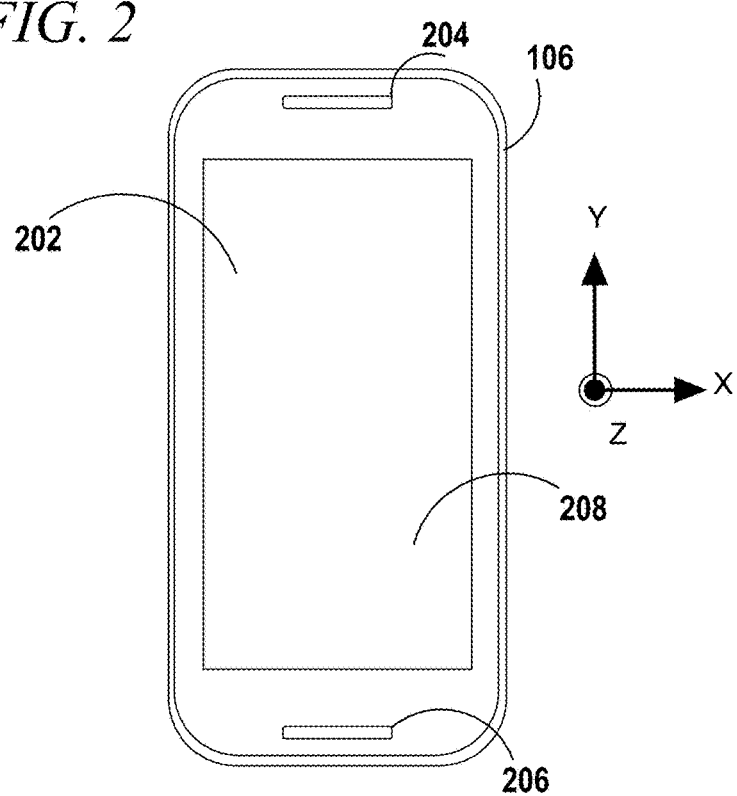
FIG. 2 is a front view of a device used in the system shown in FIG. 1 according to an embodiment.

FIG. 2 is a front view of one device 106 used in the system 100 shown in FIG. 1 according to an embodiment. The front 202 of the device 106 includes an earpiece speaker 204, a microphone 206, and a touch screen 208. The touch screen 208 is used to present one or more GUIs to a user (see FIG. 6, FIG. 13, and FIG. 14 for examples).

Figure 3:
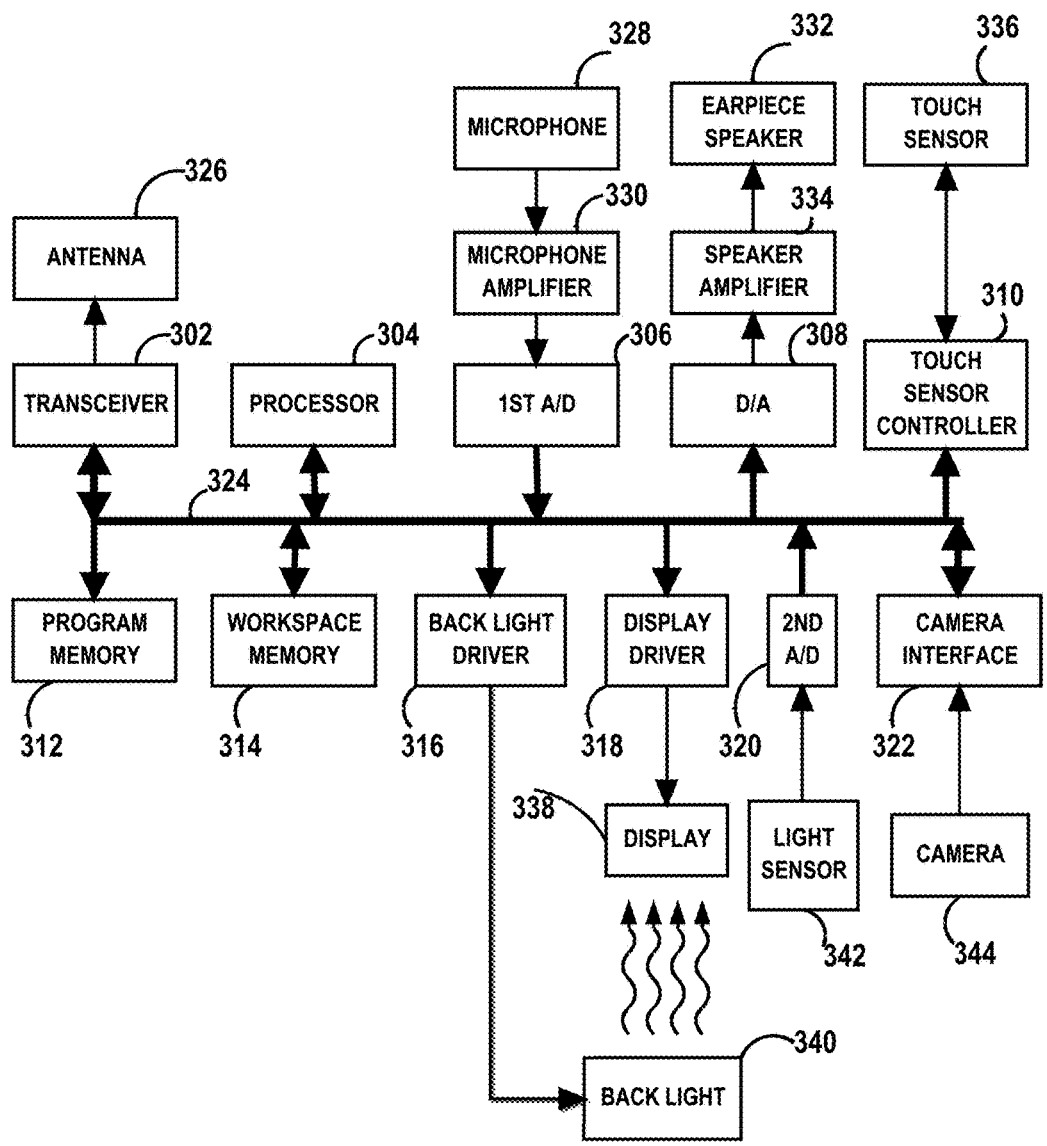
FIG. 3 is a block diagram of the device shown in FIG. 2 according to an embodiment.

FIG. 3 is a block diagram of one of the devices 106 shown in FIG. 2 according to an embodiment. As shown in FIG. 3, the device 106 includes a wireless transceiver 302, a processor 304, a first analog-to-digital converter (A/D) 306, a digital-to-analog converter (D/A) 308, a touch sensor controller 310, a program memory 312, a workspace memory 314, a back light driver 316, a display driver 318, a second A/D 320, and a camera interface 322 all coupled to a system bus 324. The transceiver 302 is coupled to an antenna 326 so that the device 100 can transmit and receive information wirelessly. Additionally or alternatively, the device 106 may include a wired transceiver (not shown).

The processor 304 controls the overall operation of the device 106. The processor 304 uses the workspace memory 314 to execute both operating system and software application programs stored in the program memory 312. Programs that may be stored in the program memory 312 and executed by the processor 304 according to certain embodiments are described below with reference to FIG. 7 and FIG. 8. The first A/D 306 is coupled to a microphone 328 via a microphone amplifier 330, so that voice and other sounds can be input into the device 106. The D/A 308 is coupled to an earpiece speaker 332 via a speaker amplifier 334, so that voice audio and other sounds can be output from the device 106. A touch sensor 336 is coupled to the touch sensor controller 310. The touch sensor 336 is positioned over a display 338, which is coupled to the display driver 318.

The back light driver 316 is coupled to a back light 340 which is optically coupled to the display 338. The touch sensor 336 in combination with the display 338 constitutes one embodiment of the touch screen 208 as shown in FIG. 2. A light sensor 342 is coupled to the second A/D 320. A camera 344 is coupled to the camera interface 322. Images or video clips captured by the camera 344 can be displayed on the display 338.

While the electronic device shown in FIG. 3 depicts a generalized mobile phone or tablet computer schematic, different embodiments of the device 106 may have alternate, additional, or fewer components with alternate architecture. The GUI of this FIG. 3 device 106 contemplates a touch screen 208 interface, but other types of GUI interfaces, such as those using a pointer (mouse or touchpad), infrared sensor, or remote controller, are also contemplated.

Figure 4:
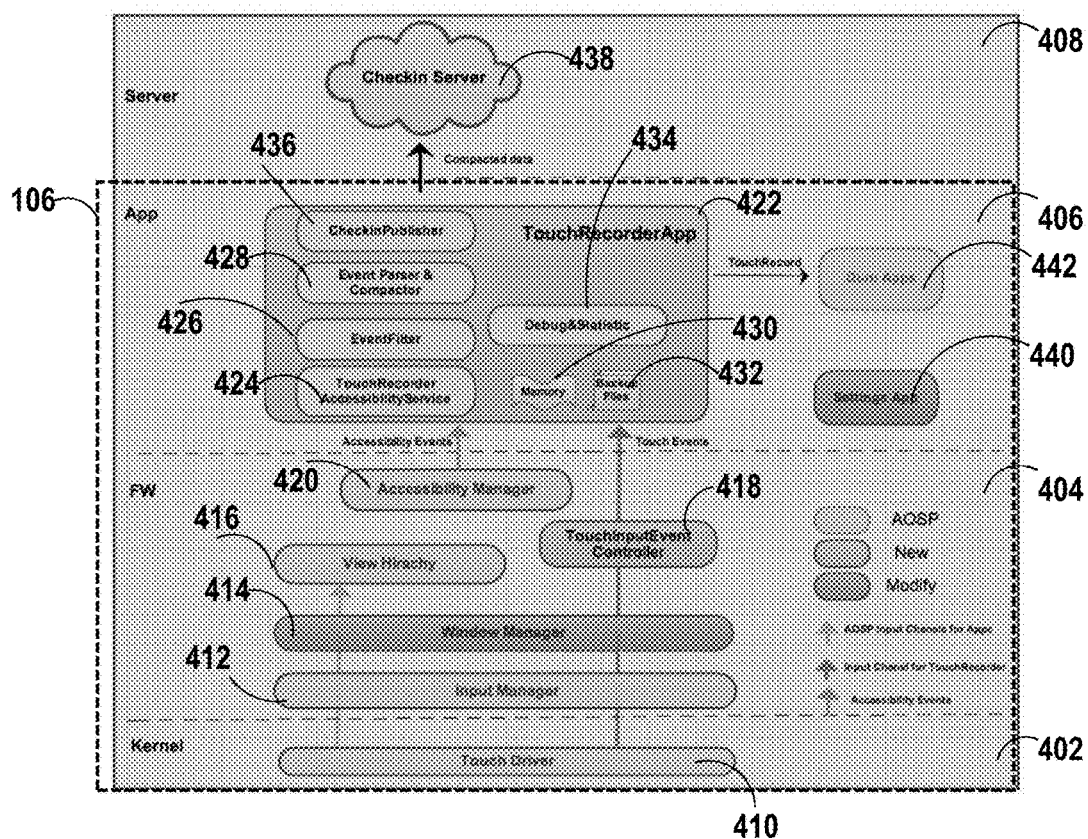
FIG. 4 is a functional block diagram of a distributed software system that may be used to implement the method shown in FIG. 12 showing details of the client side according to an embodiment.

FIG. 4 is a functional block diagram 400 of a distributed software system that may be used to implement the method shown in FIG. 12 showing details of the client side according to an embodiment. The block diagram 400 shows four communicatively coupled layers: a kernel layer 402, a firmware layer 404, an app layer 406, and a server 408. The server 408 can be implemented as the one or more servers 102 shown in FIG. 1. The kernel layer 402, the firmware layer 404, and the app layer 406 are part of the device 106. The kernel layer 402 includes a touch driver 410, which runs the touch sensor controller 310 (FIG. 3). The touch driver 410 is a standard component of Android™, which is formally known as the Android Open Source Project (ASOP), and it may interface with the touch sensor controller 310 of FIG. 3.

The firmware layer 404 includes an input manager 412, a windows manager 414, a view hierarchy 416, a touch input event controller 418, and an accessibility manager 420. The input manager 412, the view hierarchy 416, and the accessibility manager 420 are standard components of Android™. The touch driver 410 is communicatively coupled to an input manager 412 in the firmware layer 404. The input manager 412 is communicatively coupled to a windows manager 414, and the windows manager 414 is communicatively coupled to the view hierarchy 416 and the touch input event controller 418.

The accessibility manager 420 is communicatively coupled to a touch recorder app 422 in the app layer 406. The touch recorder app 422 includes a touch recorder accessibility service 424, an event filter 426, an event parser compactor 428, memory 430, back up files 432, debug and statistics data 434, and a checkin publisher module 436. The accessibility manager 420 may be used to implement elements of FIGS. 7-8 as will be described later.

The checkin publisher module 436 is communicatively coupled to a checkin server 438 of the server 408. The app layer 406 also includes a settings app 440 and guru apps 442. The guru apps 442 are applications which call the TouchRecorderApp APIs or service to get data including raw data, summary data, or key statistic data. Based on this information, a guru app 442 may adjust a user interface element's size or position in real time as will be described later in conjunction with FIG. 12.

Figure 5:
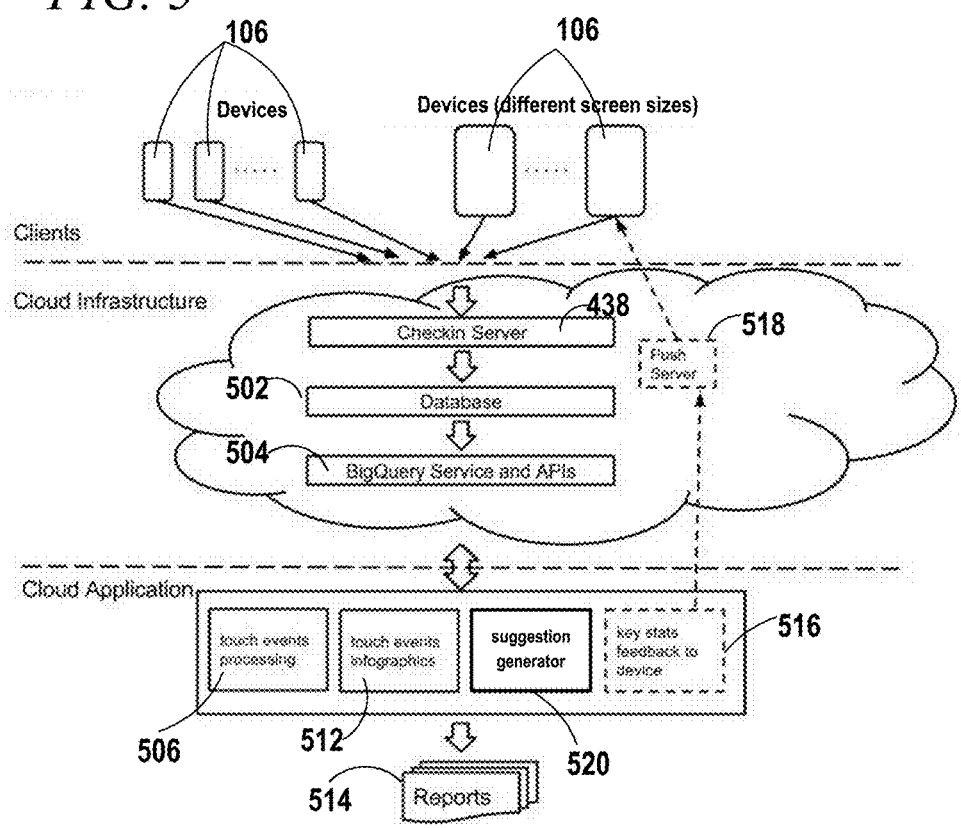
FIG. 5 is a functional block diagram of a distributed software system that may be used to implement the method shown in FIG. 12 showing details of the server side according to an embodiment.

FIG. 5 is a functional block diagram 500 of the distributed software system of FIG. 4 that may be used to implement the method shown in FIG. 12 showing details of the server side according to an embodiment. As shown in FIG. 5, a device 106 is communicatively coupled to the checkin server 438. The checkin server 438 is communicatively coupled to a database 502 that supports a BigQuery service and API calls. The BigQuery service 504 is communicatively coupled to a touch events data processing module 506. Touch event infographics 512 can be produced from the touch event data processing module 506, and reports 514 related to touch events may also be produced. The touch event data procession module can also feed a suggestion generator 520 that produces suggested GUI alternations that can be sent to an application store manager and/or the app developer. The touch event infographics 512 and the reports 514 can be made available to app developers through the one or more networks 104, for example through a special developer portal hosted on the one or more servers 102. Thus the developers can be informed about erroneous interactions with the GUIs of the apps they have developed and/or suggestions for improving GUIs. An optional module, Key stats feedback to device 516, can send the key statistical information through an optional Push Server 518 in the cloud, back to the devices, and the apps with a related Guru App 442 may adjust their user interface elements in real time by based on statistical information.

Figure 6:
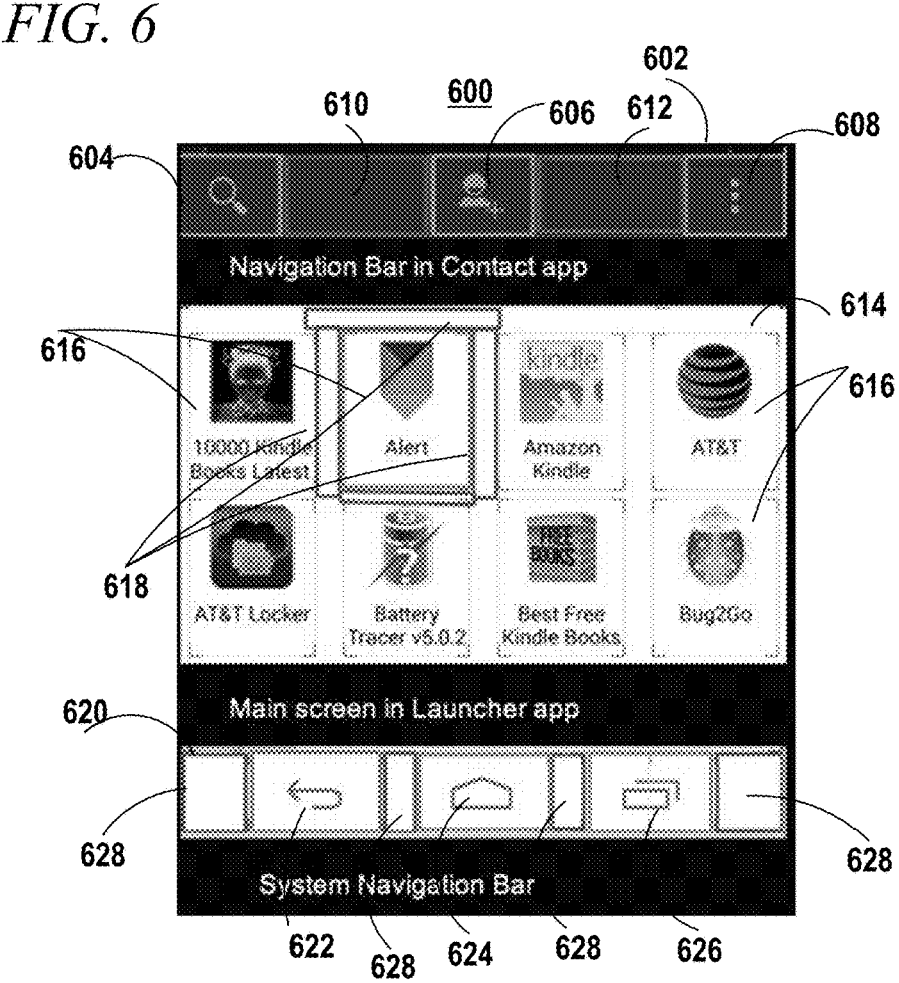
FIG. 6 shows portions of GUIs of the operating system and apps that can run on the device shown in FIG. 2 and FIG. 3 including active regions and passive regions according to an embodiment.

FIG. 6 shows portions of GUIs 600 of the operating system (OS) and apps that can run on the device shown in FIG. 2 and FIG. 3 including active regions and passive regions according to an embodiment. A navigation bar 602 for a contact management app is shown at the top of FIG. 6. The navigation bar 602 includes a search button 604, an "add contact" button 606, and a "display contact list" button 608. The aforementioned buttons 604, 606, 608 are so-called "active" regions in that touching them is meant to invoke a function. A first passive region 610 is located between the search button 604 and the "add contact" button 606; and a second passive region 612 is located between the "add contact" button 606 and the "display contact list" button 608. Touching a passive region does not invoke a function.

A portion of an OS (e.g., Android™) main screen app launcher 614 is shown in the middle of FIG. 6. The app launcher 614 includes multiple app icons 616 which are active regions surrounded by passive regions 618.

A system navigation bar 620 is shown at the bottom of FIG. 6. The system navigation bar 620 includes a "back" button 622, a "home" button 624, and a "menu" button 626. The system navigation bar 620 may be located on a portion of the touch sensor 336 adjacent, but not overlying the display 338 and in that case the icons of the buttons 622, 624, 626 of the navigation bar 620 may be permanently imprinted on or under the touch sensor 336. Passive regions 628 are located at the sides and between the buttons 622, 624, 626.

In designing a GUI, there is a conflict between the desire to fit more buttons (or other active regions) and the issue that, if the active regions are too small and close together, user accuracy in selecting a desired active region declines. For a given GUI, certain active regions, depending, at least, on their size, location, and appearance may be inaccurately actuated when compared against a user's intention. Which active regions are problematic may not be discernable a priori to a software designer. Erroneous interactions can take the form of a user touching a passive region rather than active region. Erroneous interactions can also take the form of a user touching an unintended active region.

Figure 7:
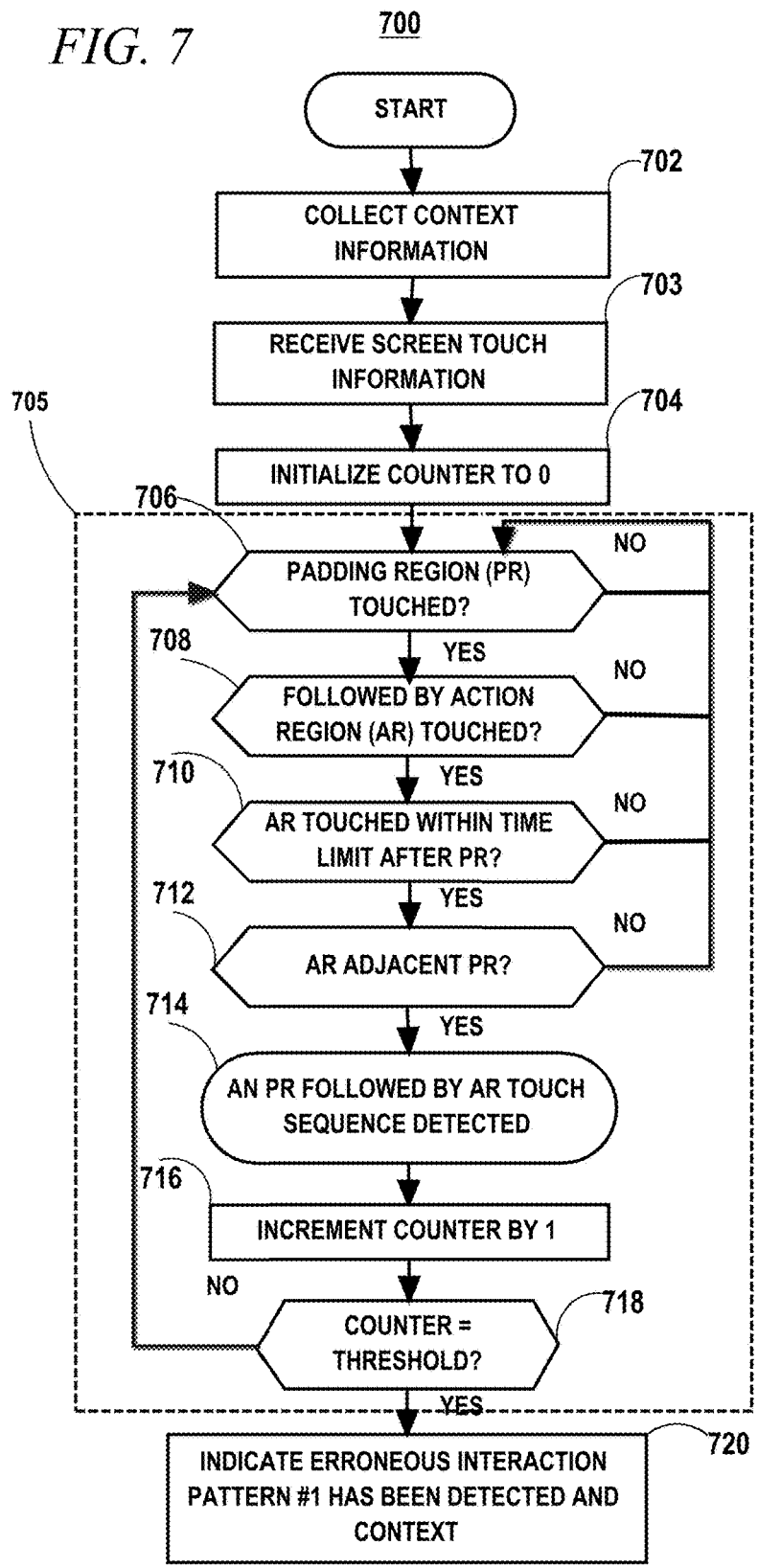
FIG. 7 is a flowchart of a process of detecting a sequence of GUI actions indicative of erroneous interactions that may be run on the device shown in FIG. 2 and FIG. 3 according to an embodiment.

FIG. 7 is a flowchart 700 of a process for detecting a sequence of GUI actions that are indicative of erroneous interactions between a user and the device. The process may be embodied in software running on the device 106 shown in FIGS. 2, 3, and 4. The process can also be embodied in software that is partly run on the device 106 and partly run on the servers 102. Data produced by the process may be communicated to the servers 102 for combining with data from similar devices and for analysis. In block 702, the device 106 processor 304 collects context information. The context information identifies an active app and the currently-displayed GUI screen within the active app. The context information may also include information identifying the make and/or model of the device 106 and its operating system version. The devices 106 may transmit the context information to the servers 102, so that the servers 102 are able to group and analyze data from multiple devices 106 having the same context information.

In block 703, the device 106 processor 304 receives screen touch information from a touch sensor controller 310. In block 704, a processor of the device initializers a counter to zero. Multiple counters may be implemented with each instance of the counter applying to particular app, a particular GUI screen within the app, and a particular erroneous interaction pattern type which can be detected in subsequent blocks 706-714.

When the processor 304 resolves the touch sensor controller 310 data to a valid touch on a passive region, the flow notifies decision block 706 that a passive region has been touched. See FIG. 6 elements 610, 612, 618, and 628 for examples of passive regions in a GUI. Touching of a passive region may be a preliminary indication of an erroneous user interaction with the GUI. When the processor 304 determines that the outcome of decision block 706 is positive, meaning that a passive region has been touched, the process 700 proceeds to decision block 708, the outcome of which depends on whether action region is touched after the passive region touch was detected in block 706. When the processor 304 determines that the outcome of block 708 is positive, meaning that an action region was touched after the passive region was touched, then the process 700 proceeds to decision block 710, the outcome of which depends on whether the active region was touched within a predetermined time limit (for example 1.5 seconds) after the passive region was touched.

When the processor 304 determines that the outcome of decision block 710 is positive meaning that the active region was touched within the predetermined time limit after the passive region was touched, the process 700 proceeds to decision block 712 the outcome of which depends on whether active region that was touched by the user is adjacent to the passive region that was touched by the user. If the outcome of decision block 712 is positive, the process 700 proceeds to decision block 714, which means that an erroneous interaction is considered to have been detected. It is inferred in this case that the user intended to press the active region that was pressed second, but inadvertently touched the adjacent passive region first.

Next in block 716 the counter that was initialized in block 704 is incremented by one. Thereafter decision block 718 tests if the counter has reached a preprogrammed threshold (e.g., 10 times). If the outcome of decision block 718 is negative, the process 700 loops back to block 706 and continues executing as previously described. If, on the other hand, decision block 718 determines that the counter has reached the threshold, then the process 700 proceeds to block 720 where the processor 304 indicates that erroneous interaction pattern 1 has been detected. The device's touch recorder app 422 may transmit this indicator to a server 102 via a wired or wireless transceiver 302 along with the context information from block 702. If the outcome of any of blocks 706, 708, 710, or 712 is negative, then the process 700 loops back to block 706 and continues executing as previously described.

By testing to see if the erroneous interaction is repeated a threshold number of times, the process 700 is discerning a persistent erroneous user interaction, as opposed to a chance or infrequent error. Alternatively, each time block 714 is reached, an indication of a single instance of an erroneous user interaction and the context information can be sent to the servers 102, and the servers 102 can then perform further data analysis to determine if the same erroneous interaction is being repeated in a population of devices with similar context information. As another alternative, the context information from block 702 and touch information from block 703 can be transmitted to a server 102 and the analysis and erroneous interaction pattern detection of block 705 can be determined by the server 102. Blocks 706, 708, 710, 712, 714, 716 together form a first erroneous interaction detector 705.

FIG. 8 is a flowchart 800 of a process of detecting another sequence of GUI actions that is indicative of another type of erroneous user interaction with a GUI. The process can be embodied in software running on the device 106 shown in FIGS. 2, 3, and 4 according to an embodiment. The process can also be embodied in software that is partly run on the device 106 and partly run on the servers 102. Blocks 802, 803, and 804 are analogous to blocks 702, 703, and 704 of the process 700 shown in FIG. 7.

Block 806 is a decision block the outcome of which depends on whether the processor 304 receives touch sensor controller 310 information indicating the user has touched a first action region. See FIG. 6 elements 604, 606, 608, 616, 622, 624, and 626 for examples of action regions in a GUI. When the first action region is touched, the process proceeds to decision block 808 which tests if shortly thereafter (e.g., within a preprogrammed time limit, e.g., 1.0 second) a back button is pressed. As shown in FIG. 6 the back button 622 is located on the system navigation bar 620. If the outcome of decision block 808 is positive, meaning that the back button (e.g., 622) was pressed shortly after the first action region was touched, then the process 800 proceeds to decision block 810 which tests if another action region is touched shortly (within a preprogrammed time limit e.g., 1.0 seconds) after the back button has been pressed. If the outcome of decision block 810 is positive then the process 800 proceeds to decision block 812 which tests if the active region which was determined to have been pressed in block 806 and the active region which was determined to have been pressed in block 810 are close to each other (e.g., separated by no more than a passive region and not by another active region).

If the outcome of decision block 812 is positive, then the process 800 proceeds to block 814, which means that the processor has detected an AR touch correction sequence. Next, in block 816, the processor 304 increments the counter that was initialized in block 804 by one. Following block 816, decision block 818 tests if the counter has reached a preprogrammed limit (e.g., 10). If so, block 820 outputs an indication that an erroneous interaction pattern has been detected. The context information collected in block 802 may be output along with the indication in block 820. The indication may be output to another program running on the device, such as a Guru App 442, or may sent through the one or more networks 104 to the servers 102.

According to certain embodiments, each device 106 executes the process 800 and the indications generated in block 820 are sent through the network(s) 104 to the servers 102. Alternatively, time stamped touch coordinate data, from block 803, and the context data collected in block 802 can be sent by each device 106 to the servers, and the remainder of the process 800 can be executed by the servers 102. When the outcome of any of decision blocks 806, 808, 810, 812, and 818 is negative, the process 800 loops back the start of block 806. Blocks 806, 808, 810, 812, 814 and 816 form a second erroneous interaction detector 805.

Figure 9:
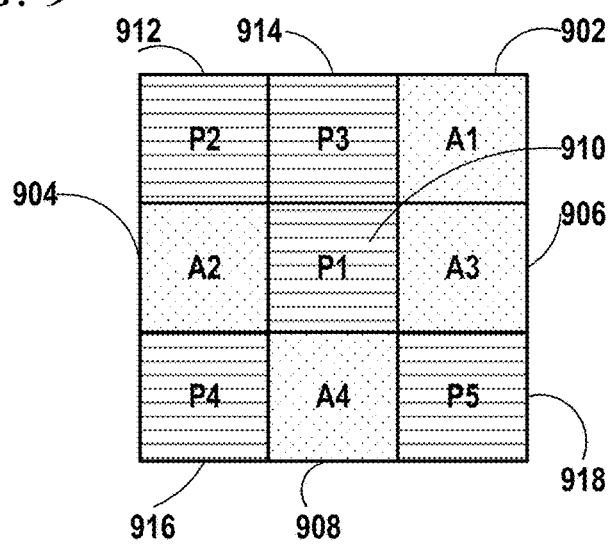
FIG. 9 is a schematic of a GUI that is prone to fostering erroneous interactions.
Figure 10:
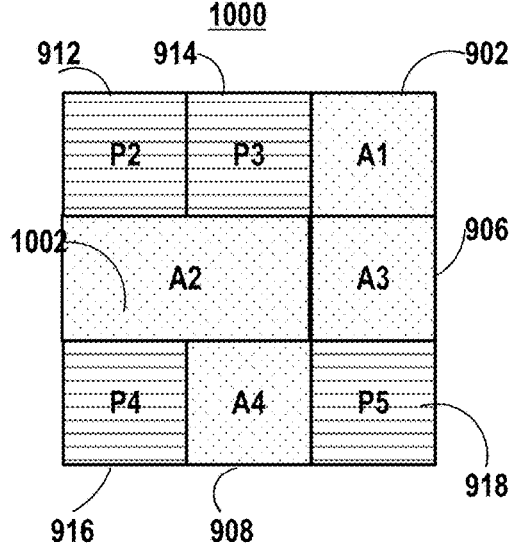
FIG. 10 is a schematic of a modified version of the GUI shown in FIG. 9 that has been modified to address certain erroneous interactions
Figure 11:
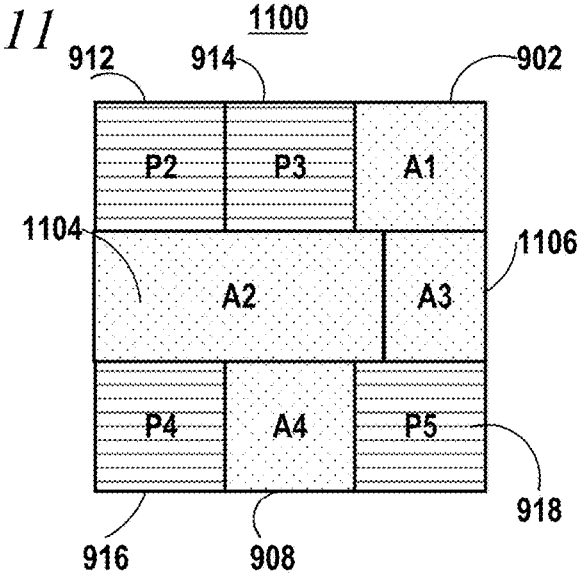
FIG. 11 is schematic of a further modified version of the GUI shown in FIG. 10 that has been modified to address erroneous interactions of another type.

FIG. 9 is a schematic of a GUI 900 in an initial state of a GUI of a displayed screen of an app. The initial state may be prone to erroneous interactions. The GUI 900 includes a first active region "A1" 902, a second active region "A2" 904, a third active region "A3" 906, and a fourth active region "A4" 908. The GUI 900 also includes a first passive region "P1" 910, a second passive region "P2" 912, a third passive region "P3" 914, a fourth passive region "P4" 916, and a fifth passive region "P5" 918. By way of example, it may be found that, for one particular user or in a statistically significant number of instances of uses across a population of devices used by a population of users, there is a tendency to press passive region "P1" 910 when the intention is to press active region "A2". This erroneous interaction can be detected by the process 700 shown in FIG. 7. The process 700 may be run on an individual device 106 or on the one or more servers 102. The latter option is suitable if the goal is to detect a statistically significant number of instances of the erroneous interaction across a population of devices. The schematically illustrated GUI 900 shown in FIG. 9 and those 1000, 1100 shown in FIGS. 10-11 are simplified to regions generally represented by boxes, and in the case of FIG. 9 boxes of equal size. In general, the region shapes may be other polygons, may be non-polygons, and may have different sizes, etc.

FIG. 10 is a schematic of a modified GUI 1000 as changed from the GUI 900 shown in FIG. 9. As shown in FIG. 10, the GUI 1000 has been modified to address the erroneous interaction that involves pressing the first passive region "P1" 910 when the user's intention was to press the second active region "A2" 904. As shown in FIG. 10 a modified form of the second active region "A2" 1002 has been expanded to cover the area previously covered by the first passive region "P1" 910 and the first passive region "P1" has been eliminated. Other GUI modifications can be implemented by a Guru App 442, or suggested by suggestion generator 502, such as narrowing P1 910, or changing its shape, rather than eliminating it.

FIG. 11 is schematic of a further modified GUI 1100 as changed from the GUI 1000 shown in FIG. 10 that has been further modified to address erroneous interactions of the type detected by process 600, i.e., a user pressing one action region when the intention was to press another action region. The GUI 1100 is modified relative to the GUI 1000 shown in FIG. 10 to address a scenario in which it is found that a particular user, or a population of users, tends to press the third active region "A3" 906 when the intention was to press the second active region "A2" 1002. To address this tendency to erroneous interaction, enlarged second active region "A2" 1002 shown in FIG. 10 has been further enlarged to make a second active region "A2" 1104 shown in FIG. 11 by utilizing some area previously assigned to the third active region "A3" 906 making a somewhat reduced size, new active region "A3" 1106. Other GUI modifications can be implemented by a Guru App 442, or suggested by suggestion generator 502, such as adding a new passive area (not shown), or changing the shape of active region 1106 in a different manner.

FIG. 12 is a flowchart 1200 of a method of identifying GUIs that are prone to fostering erroneous interactions and improving such GUIs. The method 1200 may be run on the system shown in FIG. 1 according to an embodiment. In block 1202, an app developer generates a first software code for an app and uploads it for distribution to devices 106. The first software code includes a specification of at least one layout of a GUI for the app such as shown in FIG. 11. In block 1204 the app defined by the first software code is deployed on a population of smartphones. The app may be deployed by making it available through an app store and allowing users to download and install the app on their devices 106. The app store may be hosted on the one or more servers 102. In block 1206, in each of a set of devices 106 (e.g., smartphones) a sequence of GUI actions that is indicative of erroneous user interaction is detected. The processes 700, 800 shown in FIG. 7 and FIG. 8 can be used to detect the erroneous interactions.

In block 1208 information about the erroneous interactions (e.g., information collected in blocks 702, 802 and the output of blocks 720, 820) is communicated through the one or more networks 104 to at least one server 102. In block 1210 at least one server (e.g., of the network of servers 102) aggregates information about erroneous interactions that was received in block 1208 from multiple devices in the population of devices. Through the process of aggregation, erroneous interactions that are prevalent (e.g., to a statistically significant degree) throughout the population of devices (in contrast to a case where it occurs with just one or an insignificant fraction of users) can be identified and made visible to the software developers that produced the app. In block 1212, based on the aggregated information, the first software code that was generated in block 1202 is modified to obtain a second version of software code that addresses the problem of erroneous interaction identified in blocks 1206-1210. The modified second software code can include a change in the size, position color and/or shape of a GUI element.

The ergonomics of users' interaction with the GUI of a particular app may be dependent on the size of the device 102 and its touch screen 208. For example, if the device is a smartphone with a 4.5" (11.4 cm) screen, the user may grasp the device with the fingers of one hand and operate the touch screen 208 with the thumb of the same hand—all GUI elements possibly being within reach of the thumb. On the other hand, if the device is a tablet with a 10" (25.4 cm) screen, the user may set the device on a table or hold the device with both hands and operate the touch screen 208 with fingers of two hands. According to certain embodiments a subprogram, such as BigQuery Service 504, running on the network of servers 102 accesses stored information as to the screen size for each model of electronic device and is able to associate the indications of erroneous interaction (e.g., the information output in block 520, 620) with a particular screen size based on the model information included in the context information collected in block 502, 602 (which is also sent to the network of servers 102). The subprogram can then separately aggregate the erroneous interaction information received from a population of devices for each screen size or range of screen size. For example screen sizes can be separated into a number of ranges, e.g., less than 4" (10.2 cm); 4"-5" (10.2 cm-15.2 cm); 5"-6" (12.7 cm-15.2 cm) and so on. Then the program can output information on erroneous interactions for each screen size or screen size range using elements 506, 512, 514, and 520. Subsequently developers can develop and deploy separate new versions of their app for each of multiple screen sizes with each size specific version having its GUI features redesigned to address certain erroneous interactions that were specific or more prevalent in that particular size.

Figure 13:
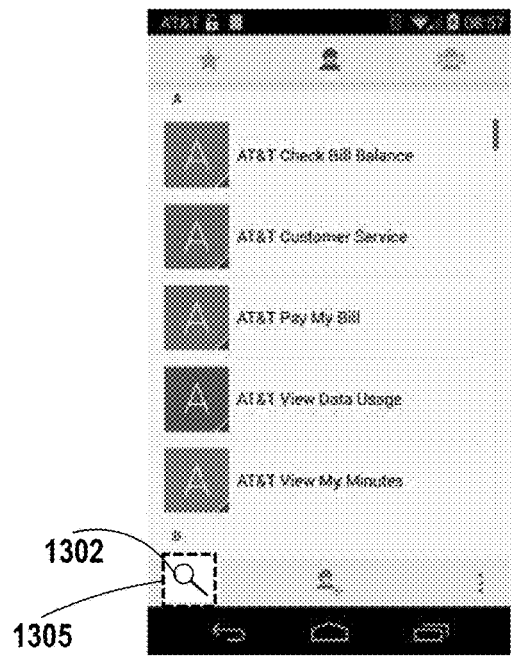
FIG. 13 is screen shot of a GUI prior to improvement by the method shown in FIG. 12.

FIG. 13 is screen shot of a first version of a GUI 1300 prior to improvement by the method shown in FIG. 12. The GUI is a screen of a contact manager app. The GUI 1300 includes a search button icon 1302 with associated active region 1305 at the lower left. The active region is a touch sensor area associated with search button icon 1302. If a user's touch is detected within active region 1305, the user's touch will be construed as actuation of the search button icon 1302. The location of the search button icon 1302 and the size of its active region 1305 leads to a statistically significant number or percentage of erroneous interactions of the type identified by the process shown in FIG. 7 and FIG. 8.

Figure 14:
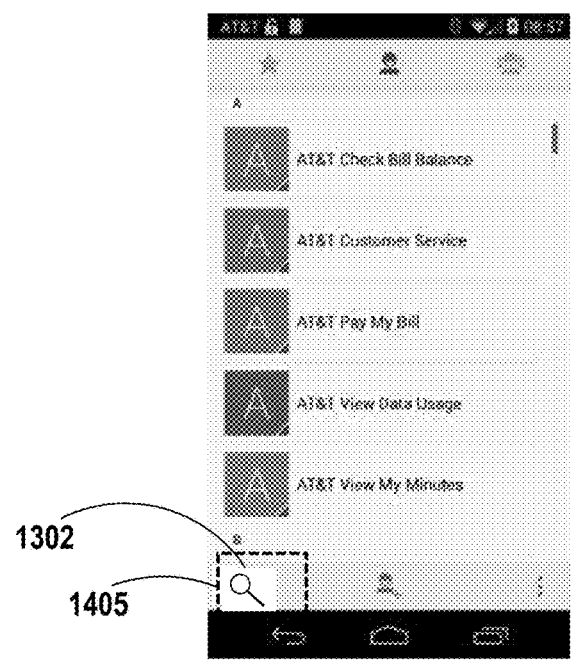
FIG. 14 is a screen shot of the GUI shown in FIG. 12 after improvement by the method shown in FIG. 12.

FIG. 14 is a screen shot of a second version of a GUI 1400 modified from the GUI 1300 shown in FIG. 13 using the method shown in FIG. 12. The second version of the GUI 1400 includes a larger active region 1405 for the search button icon 1302 that replaces the active region 1305 of the first version of the GUI 1300. More generally, the size, shape and/or location of the active region may be altered to address the erroneous user interactions. Note that the updated GUI may continue to receive touch recorder app 422 information that warrants further GUI alterations.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the disclosure described herein may be comprised of one or more conventional processors and unique stored program instructions that control the one or more processors to implement, in conjunction with certain non-processor circuits, some, most, or all of the functions of erroneous GUI interaction detection and GUI adaptation described herein. The non-processor circuits may include, but are not limited to, a radio receiver, a radio transmitter, signal drivers, clock circuits, power source circuits, and user input devices. As such, these functions may be interpreted as steps of a method to perform erroneous GUI interaction detection and GUI adaptation. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, specific embodiments of the present disclosure have been described. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

We claim:

1. A method comprising:
   receiving, by a computing device and from a server, a first version of a software application;
   while executing the first version of the software application, detecting, by the computing device, a predefined sequence of actions in a first graphical user interface that are indicative of one or more erroneous interactions with the first graphical user interface;
   sending, by the computing device and to the server, information associated with the one or more erroneous interactions, wherein the information further includes context information identifying the first version of the software application and at least one of a make or a model of the computing device, and wherein the at least one of the make or the model of the computing device is used to associate the one or more erroneous interactions with a particular size of a screen of the computing device or with a range of screen sizes that includes the particular size of the screen; and after sending the information associated with the one or more erroneous interactions to the server, receiving, by the computing device, a second version of the software application that is modified relative to the first version, wherein the second version of the software application provides a second graphical user interface that is modified, relative to the first graphical user interface, for the range of screen sizes that includes the particular size of the screen of the computing device.

2. The method of claim 1, wherein detecting the predefined sequence of actions that are indicative of the one or more erroneous interactions comprises:
detecting, by the computing device, at least a predetermined number of occurrences of a sequence of events, wherein the sequence of events includes a first touch of a passive region of the first graphical user interface followed by, within a predetermined time limit, a second touch of an active region of the first graphical user interface that is adjacent to the passive region.

3. The method of claim 2, further comprising:
responsive to detecting at least the predetermined number of occurrences of the sequence of events, adjusting, by the computing device, a size of the active region to include at least a portion of the passive region.

4. The method of claim 1, wherein detecting the predefined sequence of actions that are indicative of the one or more erroneous interactions comprises:
detecting, by the computing device, at least a predetermined number of occurrences of a sequence of events, wherein the sequence of events includes a touch of a first active region of the first graphical user interface followed by, within a predetermined time, a back button press in the first graphical user interface, followed by a touch of a second active region of the first graphical user interface.

5. The method of claim 4, further comprising:
responsive to detecting at least the predetermined number of occurrences of the sequence of events, increasing a size of the second active region.

6. The method of claim 1, further comprising:
while executing the second version of the software application, outputting, by the computing device and for display, an active region of the second graphical user interface that has at least one attribute selected from a list consisting of a size, a shape, and a position that is changed relative a corresponding region of the first graphical user interface that is output during execution of the first version of the software application.

7. A method comprising:
deploying, by a server and to a plurality of computing devices, an initial version of a software application for execution;
receiving, by the server and from a first computing device included in the plurality of computing devices, first information associated with first one or more erroneous interactions with a first graphical user interface that is output by the first computing device during execution of the initial version of the software application, wherein the first information further includes first context information identifying the initial version of the software application and at least one of a make or a model of the first computing device;
receiving, by the server and from a second computing device included in the plurality of computing devices, second information associated with second one or more erroneous interactions with a second graphical user interface that is output by the second computing device during execution of the initial version of the software application, wherein the second information further includes second context information identifying the initial version of the software application and at least one of a make or a model of the second computing device;
associating, by the server and based on the at least one of the make or the model of the first computing device, the first one or more erroneous interactions with a particular size of a screen of the first computing device or with a first range of screen sizes that includes the particular size of the screen of the first computing device;
associating, by the server and based on the at least one of the make or the model of the second computing device, the second one or more erroneous interactions with a particular size of a screen of the second computing device or with a second range of screen sizes that includes the particular size of the screen of the second computing device;
aggregating, by the server, the first information received from the first computing device with the second information received form the second computing device to obtain aggregated information;
receiving, by the server and based on the aggregated information, at least one modified version of the software application that is modified relative to the initial version of the software application, wherein the at least one modified version of the software application provides at least one graphical user interface that is modified, relative to the first graphical user interface and the second graphical user interface, for at least one of the first range of screen sizes that includes the particular size of the screen of the first computing device or the second range of screen sizes that includes the particular size of the screen of the second computing device; and
deploying, by the server and to one or more of the first computing device or the second computing device, the at least one modified version of the software application for execution.

8. The method of claim 7, further comprising:
providing, by the server, statistics on the first one or more erroneous interactions and the second one or more erroneous interactions grouped by first and second context information.

9. The method of claim 7, wherein the first one or more erroneous interactions indicate a sequence of actions in the first graphical user interface that are detected by the first computing device during execution of the initial version of the software application, and wherein the sequence of actions comprises at least a predetermined number of occurrences of a sequence of events including: a first touch of a passive region of the first graphical user interface followed by, within a predetermined time limit, a second touch of an active region of the first graphical user interface, the active region being adjacent to the passive region.

10. The method of claim 7,
wherein receiving the at least one modified version of the software application comprises:
receiving, by the server, a first modified version of the software application that is modified relative to the initial version of the software application, the first modified version of the software application providing a first modified graphical user interface that is modified relative to the first graphical user interface for the first range of screen sizes that includes the particular size of the screen of the first computing device; and receiving, by the server, a second modified version of the software application that is modified relative to the initial version of the software application, the second modified version of the software application providing a second modified graphical user interface that is modified relative to the second graphical user interface for the second range of screen sizes that includes the particular size of the screen of the second computing device, and wherein deploying the at least one modified version of the software application for execution comprises:

deploying, by the server and to the first computing device, the first modified version of the software application; and deploying, by the server and to the second computing device, the second modified version of the software application.

11. The method of claim 7, wherein the first one or more erroneous interactions indicate a sequence of actions in the first graphical user interface that are detected by the first computing device during execution of the initial version of the software application, and wherein the sequence of actions comprises at least a predetermined number of occurrences of a sequence of events including: a touch of a first active region of the first graphical user interface followed by, within a predetermined time, a back button press, followed by a touch of a second active region of the first graphical user interface.

12. The method of claim 7, further comprising:

determining, by the server and based on the at least one of the make or model of the first computing device, the first range of screen sizes that includes the particular size of the screen of the first computing device; and determining, by the server and based on the at least one of the make or model of the second computing device, the second range of screen sizes that includes the particular size of the screen of the second computing device, wherein aggregating the first information with the second information to obtain the aggregated information comprises aggregating the first information with the second information based on the first ranges of screen sizes that includes the particular size of the screen of the first computing device and on the second range of screen sizes that includes the particular size of the screen of the second computing device.

13. A computing device comprising:

one or more processors; and at least one memory storing instructions that, when executed, cause the one or more processors to:

receive, from a server, a first version of a software application;

while executing the first version of the software application, detect a predefined sequence of actions in a first graphical user interface that are indicative of one or more erroneous interactions with the first graphical user interface;

send, to the server, information associated with the one or more erroneous interactions, wherein the information further includes context information identifying the first version of the software application and at least one of a make or a model of the computing device, and wherein the at least one of the make or the model of the computing device is used to associate the one or more erroneous interactions with a particular size of a screen of the computing device or with a range of screen sizes that includes the particular size of the screen; and after sending the information associated with the one or more erroneous interactions to the server, receive a second version of the software application that is modified relative to the first version, wherein the second version of the software application provides a second graphical user interface that is modified, relative to the first graphical user interface, for the range of screen sizes that includes the particular size of the screen of the computing device.

14. The computing device of claim 13, wherein the instructions stored by the at least one memory that cause the one or more processors to detect the predefined sequence of actions that are indicative of the one or more erroneous interactions further cause the one or more processors to:

detect at least a predetermined number of occurrences of a sequence of events, wherein the sequence of events includes a first touch of a passive region of the first graphical user interface followed by, within a predetermined time limit, a second touch of an active region of the first graphical user interface that is adjacent to the passive region.

15. The computing device of claim 14, wherein the instructions stored by the at least one memory further cause the one or more processors to:

responsive to detecting at least the predetermined number of occurrences of the sequence of events, adjust a size of the active region to include at least a portion of the passive region.

16. The computing device of claim 13, wherein the instructions stored by the at least one memory that cause the one or more processors to detect the predefined sequence of actions that are indicative of the one or more erroneous interactions further cause the one or more processors to:

detect at least a predetermined number of occurrences of a sequence of events, wherein the sequence of events includes a touch of a first active region of the first graphical user interface followed by, within a predetermined time, a back button press in the first graphical user interface, followed by a touch of a second active region of the first graphical user interface.

17. The computing device of claim 16, wherein the instructions stored by the at least one memory further cause the one or more processors to:

responsive to detecting at least the predetermined number of occurrences of the sequence of events, increase a size of the second active region.

18. The computing device of claim 13, wherein the instructions stored by the at least one memory further cause the one or more processors to:

while executing the second version of the software application, output, for display, an active region of the second graphical user interface that has at least one attribute selected from a list consisting of a size, a shape, and a position that is changed relative a corresponding region of the first graphical user interface that is output during execution of the first version of the software application.

19. A server comprising:

one or more processors; and at least one memory storing instructions that, when executed, cause the one or more processors to:

deploy, to a plurality of computing devices, an initial version of a software application for execution;

receive, from a first computing device included in the plurality of computing devices, first information associated with first one or more erroneous interactions with a first graphical user interface that is output by the first computing device during execution of the initial version of the software application, wherein the first information further includes first context information identifying the initial version of the software application and at least one of a make or a model of the first computing device;

receive, from a second computing device included in the plurality of computing devices, second information associated with second one or more erroneous interactions with a second graphical user interface that is output by the second computing device during execution of the initial version of the software application, wherein the second information further includes second context information identifying the initial version of the software application and at least one of a make or a model of the second computing device;

associate, based on the at least one of the make or the model of the first computing device, the first one or more erroneous interactions with a particular size of a screen of the first computing device or with a first range of screen sizes that includes the particular size of the screen of the first computing device;

associate, based on the at least one of the make or the model of the second computing device, the second one or more erroneous interactions with a particular size of a screen of the second computing device or with a second range of screen sizes that includes the particular size of the screen of the second computing device;

aggregate the first information received from the first computing device with the second information received form the second computing device to obtain aggregated information;

receive, based on the aggregated information, at least one modified version of the software application that is modified relative to the initial version of the software application, wherein the at least one modified version of the software application provides at least one graphical user interface that is modified, relative to the first graphical user interface and the second graphical user interface, for at least one of the first range of screen sizes that includes the particular size of the screen of the first computing device or the second range of screen sizes that includes the particular size of the screen of the second computing device; and deploy, to one or more of the first computing device or the second computing device, the at least one modified version of the software application for execution.

20. The server of claim 19, wherein the instructions stored by the at least one memory further cause the one or more processors to:
provide statistics on the first one or more erroneous interactions and the second one or more erroneous interactions grouped by first and second context information.

21. The server of claim 19, wherein the instructions stored by the at least one memory further cause the one or more processors to:
determine, based on the at least one of the make or model of the first computing device, the first range of screen sizes that includes the particular size of the screen of the first computing device;
determine, based on the at least one of the make or model of the second computing device, the second range of screen sizes that includes the particular size of the screen of the second computing device; and
aggregate the first information with the second information based on the first range of screen sizes that includes the particular size of the screen of the first computing device and on the second range of screen sizes that includes the particular size of the screen of the second computing device.

22. The server of claim 19,
wherein the instructions stored by the at least one memory that cause the one or more processors to receive the at least one modified version of the software application further cause the one or more processors to:
receive a first modified version of the software application that is modified relative to the initial version of the software application, the first modified version of the software application providing a first modified graphical user interface that is modified relative to the first graphical user interface for the first range of screen sizes that includes the particular size of the screen of the first computing device; and
receive a second modified version of the software application that is modified relative to the initial version of the software application, the second modified version of the software application providing a second modified graphical user interface that is modified relative to the second graphical user interface for the second range of screen sizes that includes the particular size of the screen of the second computing device, and
wherein the instructions stored by the at least one memory that cause the one or more processors to deploy the at least one modified version of the software application for execution further cause the one or more processors to:
deploy, to the first computing device, the first modified version of the software application; and
deploy, to the second computing device, the second modified version of the software application.

* * * * *